(12) United States Patent
Maurice et al.

(10) Patent No.: US 9,429,182 B2
(45) Date of Patent: Aug. 30, 2016

(54) ATTACHMENT DEVICE WITH IMPROVED OPENABLE SWIVEL

(71) Applicant: ZEDEL, Crolles (FR)

(72) Inventors: Alain Maurice, Saint Hilaire du Touvet (FR); Christophe Quillard, Eybens (FR)

(73) Assignee: ZEDEL, Crolles (FR)

( * ) Notice: Subject to any disclaimer, the term of this patent is extended or adjusted under 35 U.S.C. 154(b) by 71 days.

(21) Appl. No.: 14/555,910

(22) Filed: Nov. 28, 2014

(65) Prior Publication Data

US 2015/0143674 A1 May 28, 2015

(30) Foreign Application Priority Data

Nov. 27, 2013 (FR) ..................................... 13 02746

(51) Int. Cl.
| | | |
|---|---|---|
| *F16B 45/00* | (2006.01) | |
| *F16B 45/02* | (2006.01) | |
| *F16B 45/04* | (2006.01) | |
| *F16G 15/06* | (2006.01) | |
| *F16G 15/08* | (2006.01) | |

(52) U.S. Cl.
CPC ............... *F16B 45/04* (2013.01); *F16G 15/06* (2013.01); *F16G 15/08* (2013.01); *Y10T 24/45304* (2015.01)

(58) Field of Classification Search
CPC . F16B 45/02; A01K 27/003; Y10T 24/3491; Y10T 24/3485
USPC ........ 24/265 H, 600.8, 600.5, 600, 7; 59/95, 59/78; 294/82.1, 82.17
See application file for complete search history.

(56) References Cited

U.S. PATENT DOCUMENTS

| | | | | | |
|---|---|---|---|---|---|
| 505,281 | A | * | 9/1893 | Smith .................... | F16B 45/04 24/374 |
| 974,950 | A | * | 11/1910 | Carter .................... | F16B 45/04 24/582.11 |
| 1,253,971 | A | * | 1/1918 | Hipsher ................. | F16G 15/08 59/95 |
| 1,276,008 | A | * | 8/1918 | Baxter .................... | F16B 45/04 24/598.4 |
| 1,276,012 | A | * | 8/1918 | Baxter .................... | F16B 45/04 24/598.4 |
| 1,602,611 | A | * | 10/1926 | Hickok .................. | F16G 11/14 24/115 R |
| 1,605,853 | A | * | 11/1926 | O'Bannon ............. | E21B 19/04 24/599.1 |
| 1,645,714 | A | * | 10/1927 | Neilson .................. | E21B 19/04 294/82.11 |
| 1,847,206 | A | * | 3/1932 | Baxter .................... | F16B 45/04 24/600.7 |
| 1,852,689 | A | * | 4/1932 | Baxter .................... | F16B 45/00 24/375 |
| 2,193,291 | A | * | 3/1940 | Marchins ............... | F16G 15/08 59/89 |
| 2,400,291 | A | * | 5/1946 | D'Aleo .................. | B63B 21/24 403/164 |
| 2,423,050 | A | * | 6/1947 | Rundell ................. | F16G 15/08 4/405 |
| 2,709,616 | A | * | 5/1955 | Sjunne ................... | F16G 15/06 24/115 R |
| 3,230,004 | A | * | 1/1966 | Lock ...................... | B66C 1/34 29/898.07 |
| 3,261,636 | A | * | 7/1966 | St Pierre ................ | F16G 15/06 294/82.1 |

(Continued)

FOREIGN PATENT DOCUMENTS

| | | |
|---|---|---|
| FR | 397.596 | 5/1909 |
| FR | 2 950 122 | 3/2011 |
| WO | WO 2011/030008 A1 | 3/2011 |

*Primary Examiner* — Robert J Sandy
*Assistant Examiner* — Jason W San
(74) *Attorney, Agent, or Firm* — Oliff PLC

(57) ABSTRACT

A swivel attachment device comprising a pair of rings able to rotate freely with respect to one another around an axis of rotation defined by a central pivot-pin. At least one of the rings is in the form of a hook delineating a lateral access space. A removable closing part, composed of a spacer through which a fixing screw passes, is able to close said space performing partial take-up of the tensile forces.

4 Claims, 4 Drawing Sheets

(56) References Cited

U.S. PATENT DOCUMENTS

| | | | | |
|---|---|---|---|---|
| 3,815,184 A * | 6/1974 | Hopp | F16B 45/04 | 24/600.7 |
| 4,141,116 A * | 2/1979 | Zalonis | A01K 91/03 | 24/375 |
| 4,152,814 A * | 5/1979 | Ito | F16B 45/02 | 24/599.3 |
| 4,274,252 A * | 6/1981 | Cavender | F16G 15/08 | 59/86 |
| 4,372,016 A * | 2/1983 | LaViolette | B66C 1/36 | 24/598.4 |
| 4,482,264 A * | 11/1984 | Kodera | A01K 91/03 | 403/165 |
| 4,689,860 A * | 9/1987 | Suchowski | A01K 27/005 | 24/600.7 |
| 4,914,903 A * | 4/1990 | Bernt | F16G 15/06 | 474/218 |
| 5,381,650 A * | 1/1995 | Garrett | F16G 15/08 | 403/78 |
| 5,634,246 A | 6/1997 | Jermyn, Jr. | | |
| 5,823,588 A * | 10/1998 | Morghen | B66C 1/66 | 294/89 |
| D425,781 S * | 5/2000 | Hopper | D8/382 | |
| 7,059,023 B1* | 6/2006 | Wu | F16B 45/00 | 24/370 |
| 8,016,073 B2* | 9/2011 | Petzl | F16B 45/02 | 182/3 |
| 8,590,120 B2* | 11/2013 | Sakai | A01K 27/005 | 24/600.7 |
| 2003/0070267 A1* | 4/2003 | Kung | F16B 45/04 | 24/600.5 |
| 2004/0088838 A1* | 5/2004 | Chen | F16B 45/04 | 24/598.4 |
| 2005/0229367 A1* | 10/2005 | Thompson | F16B 45/02 | 24/599.9 |
| 2005/0246874 A1* | 11/2005 | Hsu | F16B 45/02 | 24/598.2 |
| 2006/0085954 A1* | 4/2006 | Chen | F16B 21/12 | 24/265 H |
| 2007/0193005 A1* | 8/2007 | Chalk | A01K 27/003 | 24/265 H |
| 2007/0261210 A1* | 11/2007 | Chen | F16B 21/165 | 24/265 H |
| 2007/0294867 A1* | 12/2007 | Lin | F16B 45/04 | 24/600.4 |
| 2008/0022497 A1* | 1/2008 | Thompson | F16B 45/02 | 24/598.1 |
| 2009/0208274 A1* | 8/2009 | Liang | F16G 15/08 | 403/164 |
| 2009/0265901 A1* | 10/2009 | Berney | F16B 45/00 | 24/591.1 |
| 2010/0139052 A1* | 6/2010 | Lin | F16B 45/04 | 24/265 H |
| 2010/0186202 A1* | 7/2010 | Schwappach | F16B 45/02 | 24/599.9 |
| 2010/0269314 A1* | 10/2010 | Petzl | F16B 45/04 | 24/591.1 |
| 2010/0306974 A1* | 12/2010 | Munoz | F16B 45/02 | 24/598.8 |
| 2011/0247183 A1 | 10/2011 | Tylaska et al. | | |
| 2012/0017405 A1 | 1/2012 | Tozawa | | |
| 2013/0025096 A1* | 1/2013 | Tozawa | A01K 27/005 | 24/600.9 |
| 2013/0086778 A1* | 4/2013 | Sakai | A01K 27/005 | 24/598.4 |
| 2013/0104351 A1* | 5/2013 | Casebolt | A62B 35/0037 | 24/522 |
| 2014/0298630 A1* | 10/2014 | Hortnagl | A44B 11/2592 | 24/697.2 |
| 2014/0361564 A1* | 12/2014 | Huang | F16B 45/02 | 294/82.11 |
| 2015/0226254 A1* | 8/2015 | Nonoguchi | A01K 27/005 | 24/524 |
| 2015/0322996 A1* | 11/2015 | Mitchell | F16B 45/04 | 24/303 |
| 2016/0017912 A1* | 1/2016 | Jang | F16B 45/02 | 24/599.5 |
| 2016/0047409 A1* | 2/2016 | Fitz-Earle | F16B 45/02 | 24/456 |

* cited by examiner

ATTACHMENT DEVICE WITH IMPROVED OPENABLE SWIVEL

BACKGROUND OF THE INVENTION

The invention relates to a swivel attachment device comprising a pair of rings able to rotate freely with respect to one another around an axis of rotation defined by a central pivot-pin, at least one of the rings being in the form of a hook delineating a space for lateral access.

STATE OF THE ART

A known swivel of the kind mentioned comprises two rings able to rotate around a central pivot-pin, wherein each ring is formed by end-to-end assembly of the ends of two U-shaped parts. Two screws are necessary to close each ring. In the assembled position of the ring, the two screws are sunk in the body of the ring, and are not visible from the outside. In the case of incomplete closure with a single screw, or of insufficient tightening, the visible state of the ring appears normal, but to the detriment of its mechanical strength.

Other known attachment products concern shackles able to rotate around a closed ring. These devices have large dimensions and are not very practical to use. If the shackle is not well suited to the load, the tractive force can be applied on the edge of the shackle and is therefore not centred on the axis of rotation of the swivel assembly.

Instead of shackles, snap-hooks also exist coupled with rotation to a ring by a pivot-pin. Snap-hooks have pivoting fingers with automatic closing able to be latched. The large dimensions of the latter do not make handling operations easy, and the load take-up by the closed finger is insufficient. Such a swivel system is described in the document U.S. Pat. No. 5,634,246.

OBJECT OF THE INVENTION

The object of the invention consists in providing an openable swivel of smaller dimensions, and having a closing system that is resistant and dependable while at the same time being compatible with different uses and connection equipment.

The attachment device according to the invention is characterized in that a closing part is designed to close said space performing partial take-up of the tractive forces, said closing part comprising a removable fixing screw extending in substantially parallel manner to the central pivot-pin in the closed state.

According to an example embodiment, the closing part is composed of a spacer through which the fixing screw passes, the assembly being able to be dismantled.

The bottom of the hook preferably presents a rounded shape arranged in such a manner that application of a tensile load takes place in the direction of the axis of rotation of the swivel.

Such a device presents compact dimensions with a closing system that is resistant and permanently visible, thereby giving the latter an enhanced dependability.

According to one feature of the invention, the hollow base of one of the rings comprises an annular positioning surface collaborating with a rim of the other ring while leaving a predefined clearance for free rotation of the rings. The base of the ring is provided with a housing for receiving a bearing which is inserted between the head of the pivot-pin and the rim of the other ring.

The closing parts can naturally be formed by simple bolts extending in substantially parallel direction to the central pivot-pin. The end surfaces of the hook are advantageously parallel and extend substantially orthogonally to the axis of rotation.

According to a first embodiment, the two rings are openable by means of two screws having opposite tightening and loosening directions in the axial direction of the axis of rotation.

According to a second embodiment, only one of the rings is openable, the other not being provided with a closing part.

BRIEF DESCRIPTION OF THE DRAWINGS

Other advantages and features will become more clearly apparent from the following description of an embodiment of the invention given for non-restrictive example purposes only and represented in the appended drawings, in which.

DETAILED DESCRIPTION OF THE INVENTION

Figure 1:
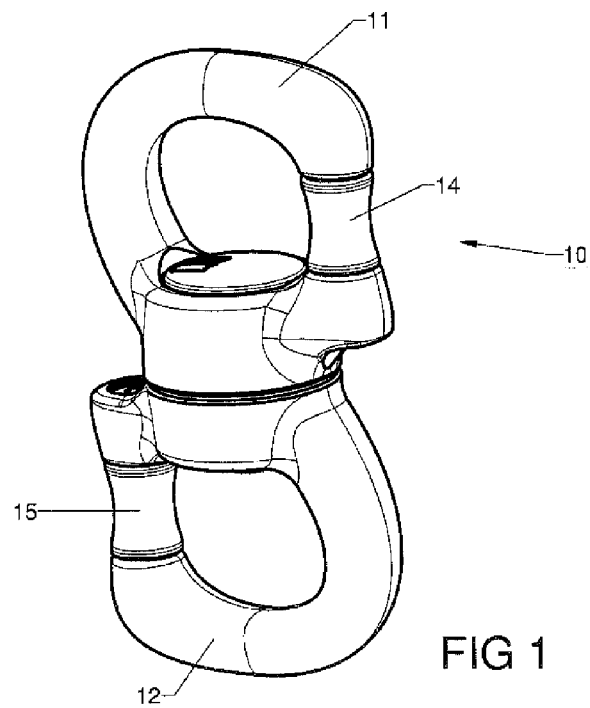
FIG. 1 is a perspective view of the swivel attachment device according to the invention with two openable rings.
Figure 2:
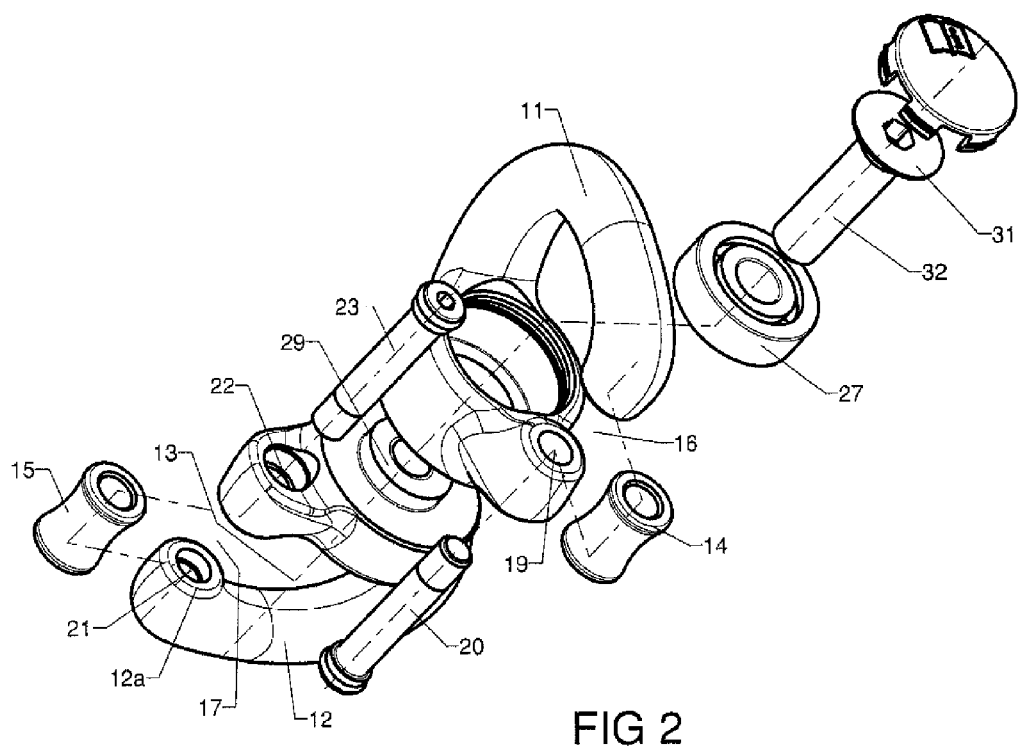
FIG. 2 shows an exploded view of the device of FIG. 1.
Figure 3:
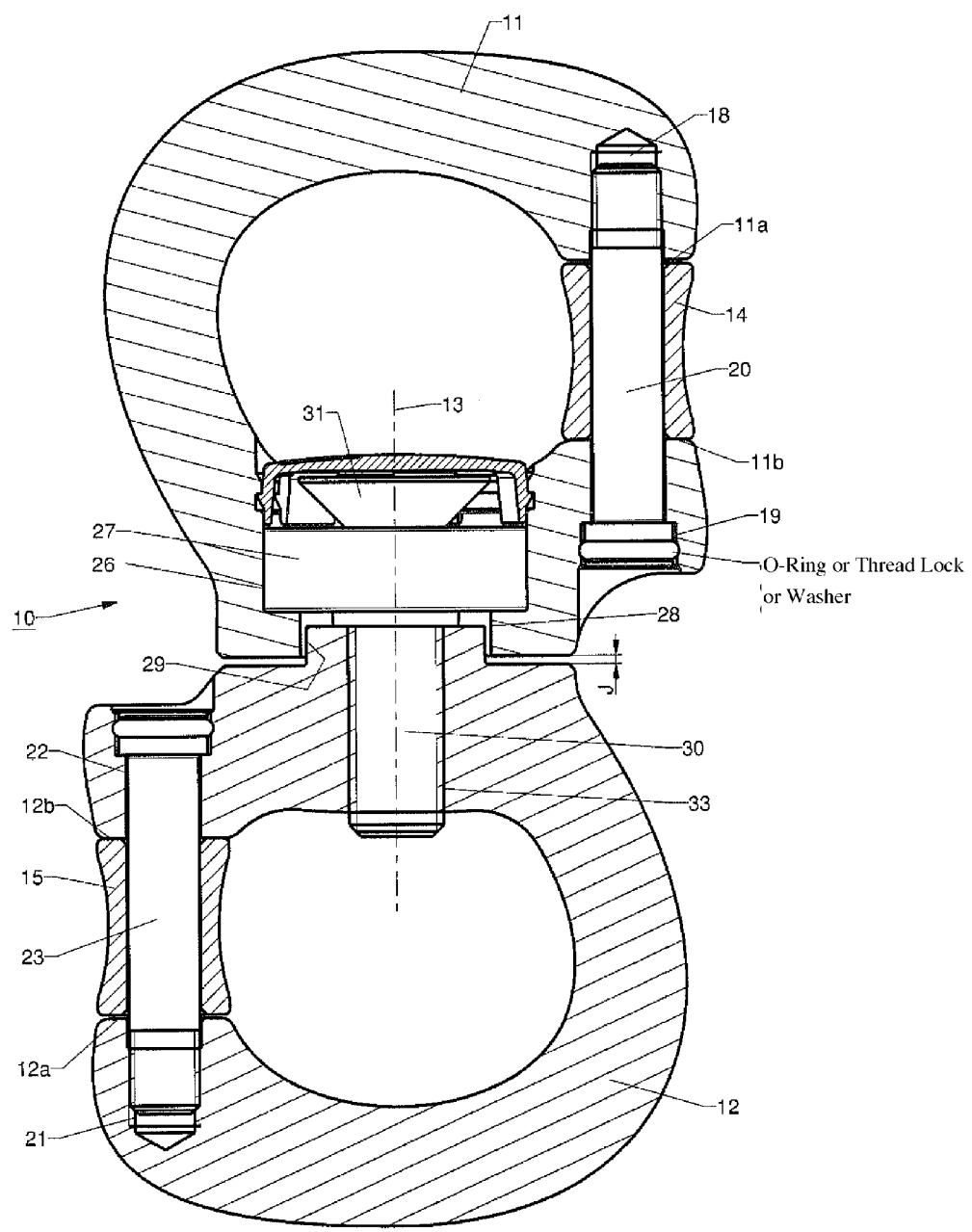
FIG. 3 represents a cross-sectional view of FIG. 1.

In FIGS. 1 to 3, a swivel attachment device, denoted by the general reference numeral 10, comprises a pair of rings 11, 12 able to rotate freely with respect to one another around a common axis of rotation 13. The two rings 11, 12 are made for example from aluminium alloy or from any other metallic material.

Each ring 11, 12 is composed of a C-shaped open hook and a closing part designed to close the lateral space 16, 17 of the corresponding hook. Each closing part for example comprises a spacer 14, 15 through which a fixing screw 20, 23 passes. Space 16, 17 is arranged between the two flat and parallel end surfaces 11a, 11b; 12a, 12b of the hook to enable insertion of a strap loop or a rope in ring 11, 12 after the corresponding closing part has been removed.

Figure 4:
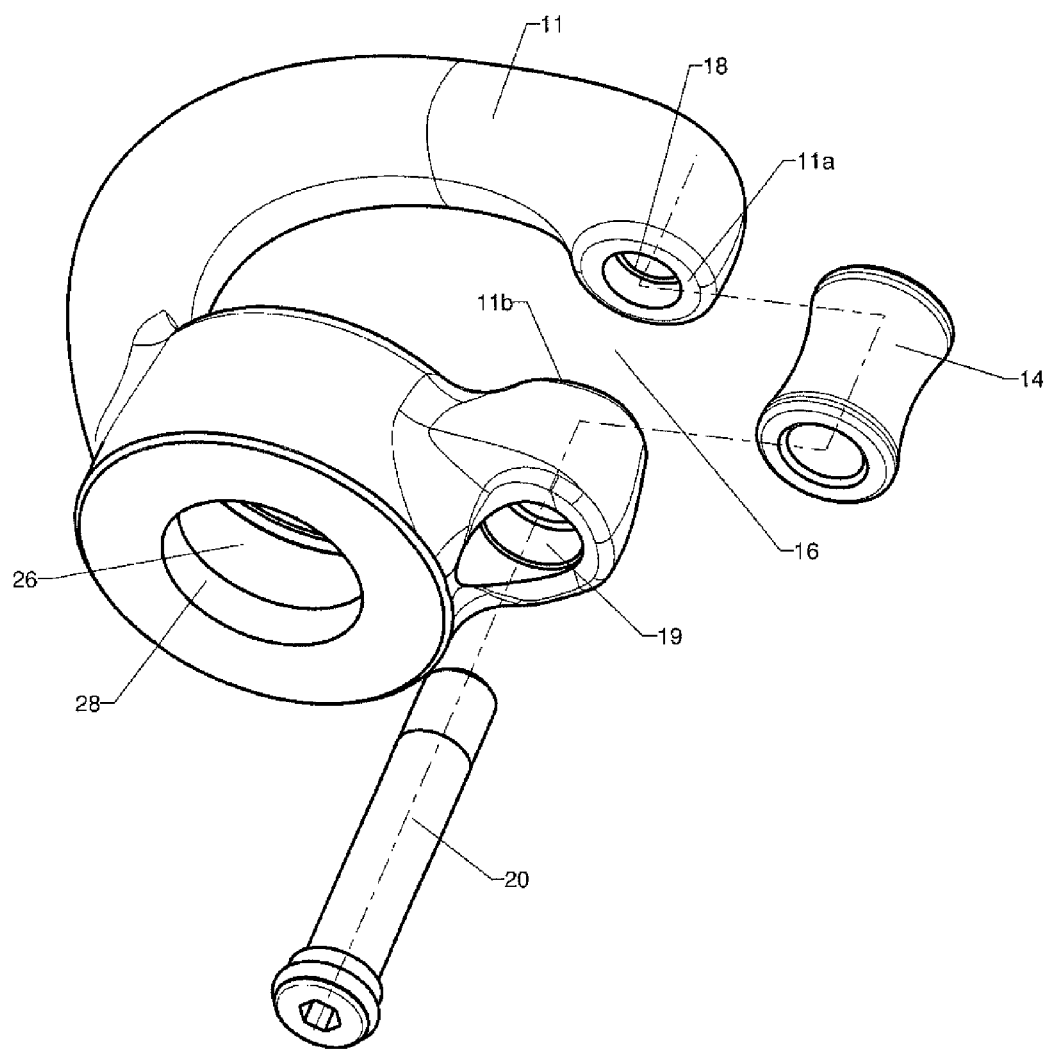
FIG. 4 illustrates an exploded perspective view of the top ring after the spacer has been removed from the lateral space.

In FIG. 4, one of the surfaces 11a of top ring 11 is provided with a first threaded blind hole 18, and the other surface 11b of the same ring 11 is provided with a second hole 19 that is pass-through and not threaded. The two holes 18, 19 are aligned substantially in a direction parallel to the axis of rotation 13 to enable a screw 20 to pass through.

The whole of this assembly can be inclined with respect to the axis of rotation 13 to improve the shape or the space occupation of the swivel.

The same is the case for the other bottom ring 12 which is inverted with respect to first ring 11. Surface 12a is provided with a third threaded blind hole 21, and the other surface 12b is equipped with a fourth hole 22 that is pass-through and not threaded. The two holes 21, 22 are aligned substantially in a direction parallel to the axis of rotation 13 to enable another screw 23 to pass through.

Spacer 14, 15 of each closing part has a substantially cylindrical shape, and has a bore 24, 25 axially drilled therein for passage of screws 20, 23. The axial length of the spacer corresponds to the interval of lateral space 16, 17, and the diameter of the bore 24, 25 is slightly larger than that of screws 20, 23.

The base of top ring 11 comprises an annular housing 26 designed for fitting a ball-bearing or rollers 27. The bottom end of the base is open delineating an annular positioning surface 28.

The top of bottom ring 12 is equipped with a rim 29 which fits into annular positioning surface 28 for axial centring of the two rings 11, 12. A pivot-pin 30 is used to constitute the axis of free rotation 13 of the two rings 11, 12. Head 31 of pivot-pin 30 presses on the bearing cage 27, and its shank 32 passes through bearing 27 and is secured in an aperture 33 of ring 12. The assembly formed by bearing 27 and pivot-pin 30 is configured so as to leave a clearance J of small thickness between the base and the top of the two rings 11, 12 to enable rotational movement thereof in both directions.

Preferably, the two spacers of closing parts 14, 15 are made from metallic material and are arranged to avoid any dangerous catching points inside rings 11, 12. They can have a coating of different hook. A single screw 20, 23 is necessary to close each ring 11, 12, and the corresponding spacer remains perfectly visible from the outside in the assembled position. The strap loop or rope remains captive in ring 11, 12 with total safety, while at the same time remaining angularly mobile due to the rounded or continuous inner surfaces.

When the swivel is tensioned, these strap loops or the rope automatically position themselves in the rounded hollow of hook 11, 12 coinciding with the axis of rotation 13 of the swivel assembly.

To open one of the rings 11, 12, the corresponding screw 20, 23 simply has to be unscrewed by means of a spanner (not represented), and spacer 14, 15 be removed to release lateral space 16, 17. It is then possible to replace one rope loop by another, or by any other attachment means.

The two screws 20, 23 extend in substantially parallel manner to the axis of rotation 13 of pivot-pin 30, and are fitted in the reverse direction to one another for fixing of the two closing parts 14, 15.

It is clear that screws 20, 23 and spacers 14, 15 can be replaced by bolts or any other removable fixing means designed for partial take-up of tractive forces. Screws 20, 23 can also be inclined with respect to axis of rotation 13 without departing from the scope of the invention.

Figure 5:
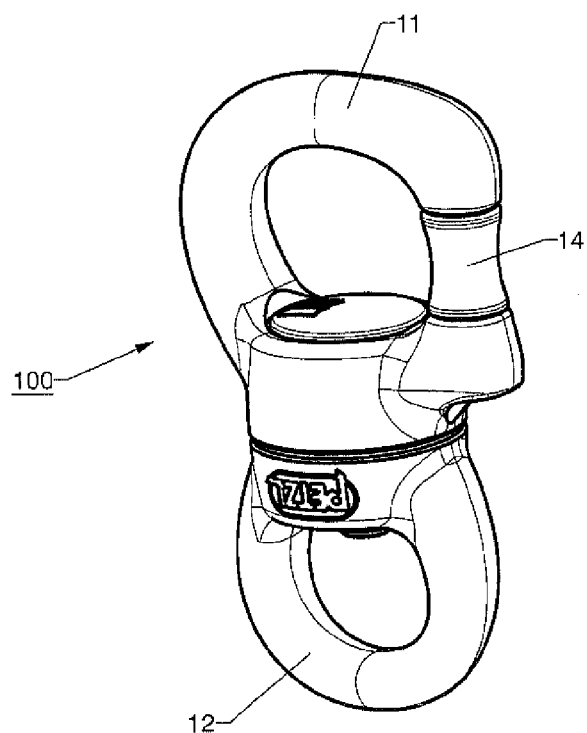
FIGS. 5 and 6 are similar views to FIGS. 1 and 2 of an alternative embodiment with a single openable ring.
Figure 6:
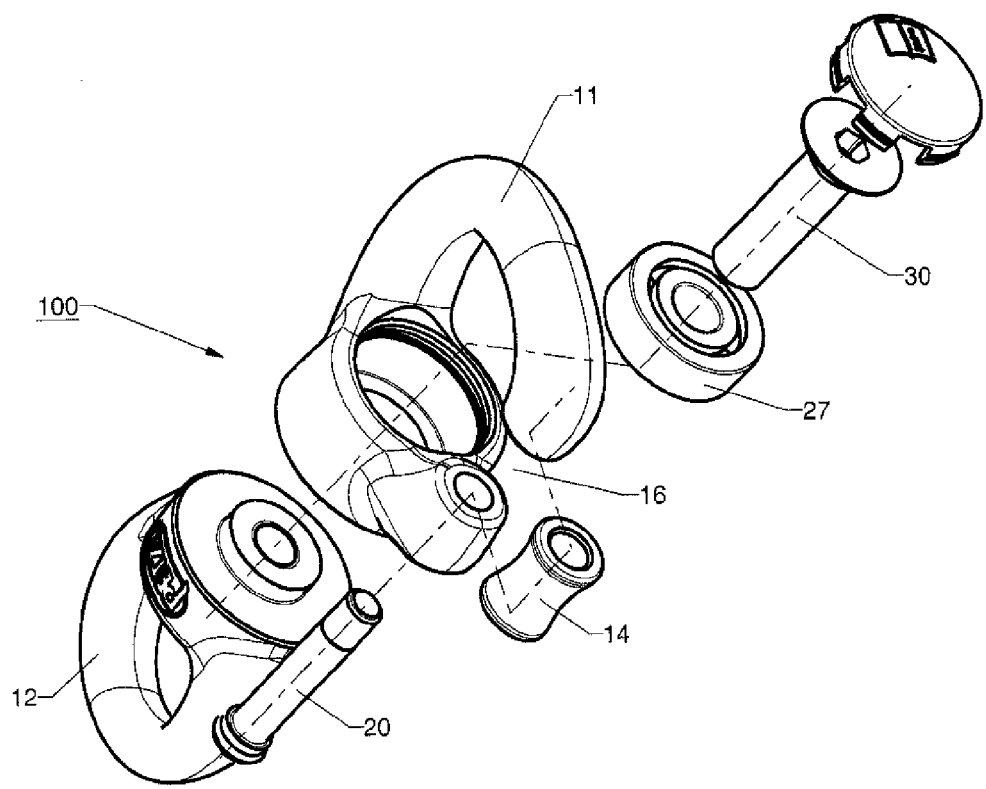

In the alternative embodiment of FIGS. 5 and 6, only one of rings 11 is openable. Swivel attachment device 100 is similar to that 10 of the previous figures, but ring 12 is totally closed being devoid of any lateral space 17 and of its spacer. The same reference numerals will be used to denote identical or similar parts. Ring 11 is identical to the one described in the foregoing.

The invention claimed is:

1. A swivel attachment device comprising:
   a pair of rings able to rotate freely with respect to one another around an axis of rotation formed by a central pivot-pin,
   at least one of the rings being in the form of a hook delineating a lateral access space,
   a closing part designed to close said space performing partial take-up of the tractive forces, said closing part comprising a removable fixing screw being laterally spaced apart from the axis of rotation, and extending in a substantially parallel direction to the central pivot-pin in the closed state,
   said closing part comprising a spacer through which said fixing screw passes, said spacer pressing on two opposite surfaces of the hook, and
   one of the rings having a hollow base comprising an annular positioning surface cooperating with a rim of the other ring leaving a predefined clearance for free rotation of the rings around the central pivot-pin, wherein the base of the ring is provided with a housing for receipt of a bearing, which is inserted between the head of the pivot-pin and the rim of the other ring, the bearing and the pivot-pin being configured to leave a clearance between the pair of rings.

2. The swivel attachment device according to claim 1, wherein the end surfaces of the hook are parallel and extend orthogonally to the axis of rotation.

3. The swivel attachment device according to claim 1, wherein the two rings are openable by means of two screws having opposite tightening and loosening directions in the axial direction of the axis of rotation.

4. The swivel attachment device according to claim 1, wherein each of the pair of rings being in the form of a hook delineating a respective lateral access space,
   a respective closing part designed to close each said respective space performing partial take-up of the tractive forces, each said respective closing part comprising a removable fixing screw being laterally spaced apart from the axis of rotation, and extending in a substantially parallel direction to the central pivot-pin in the closed state,
   each said respective closing part comprising a spacer through which said fixing screw passes, said spacer pressing on two opposite surfaces of the hook.

* * * * *